Sept. 25, 1956  S. L. RICHARDS, JR  2,764,218
APPARATUS FOR COATING AND REINFORCING PIPE
Filed Dec. 15, 1950  7 Sheets-Sheet 1

Sidney L. Richards, Jr.
INVENTOR.

BY
Charles E. Lightfoot
ATTORNEY.

Sept. 25, 1956　　　S. L. RICHARDS, JR　　　2,764,218
APPARATUS FOR COATING AND REINFORCING PIPE
Filed Dec. 15, 1950　　　　　　　　　　　　　7 Sheets-Sheet 2
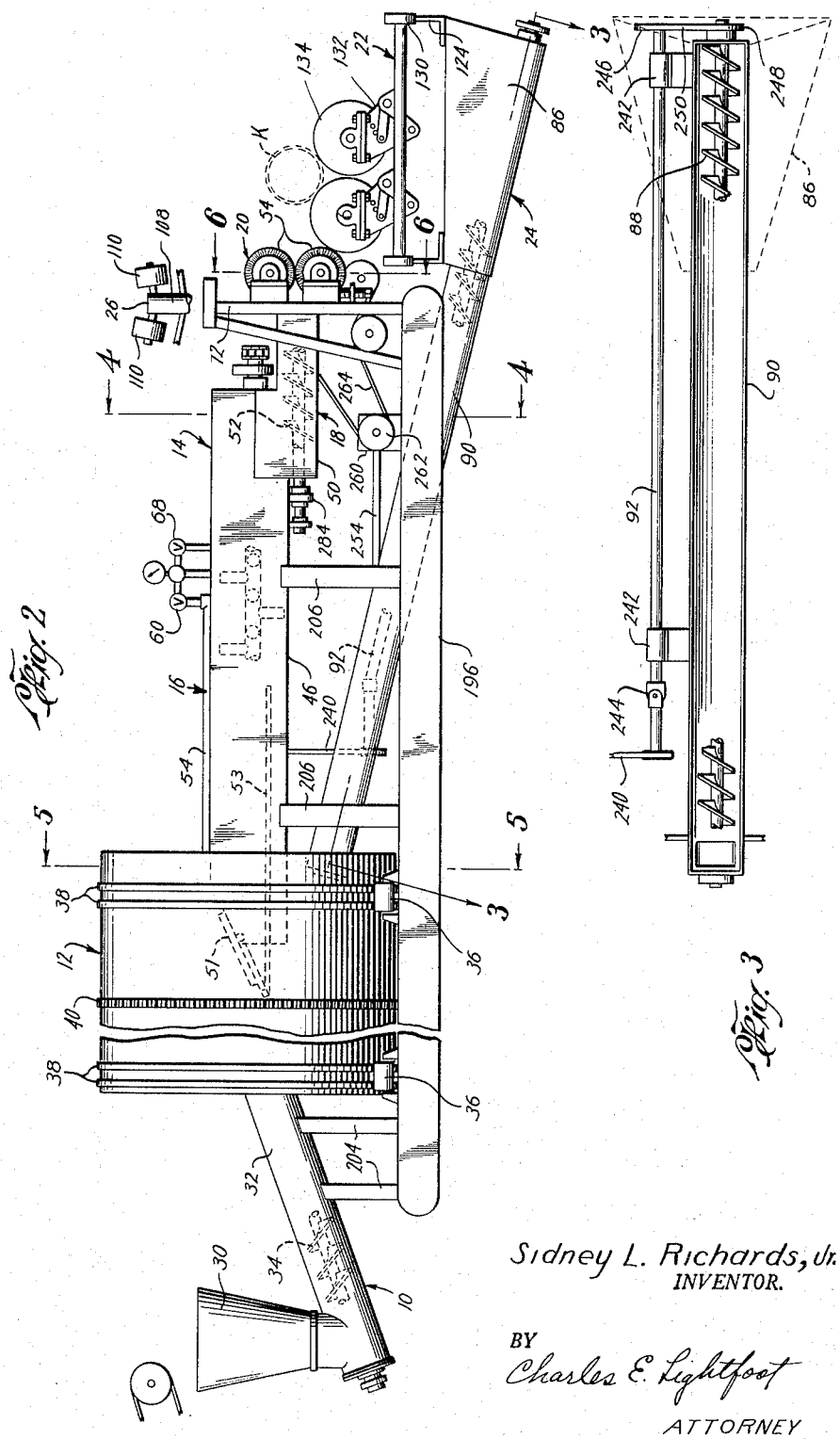
Sidney L. Richards, Jr.
INVENTOR.
BY Charles E. Lightfoot
ATTORNEY Sept. 25, 1956 S. L. RICHARDS, JR 2,764,218
APPARATUS FOR COATING AND REINFORCING PIPE
Filed Dec. 15, 1950 7 Sheets-Sheet 3
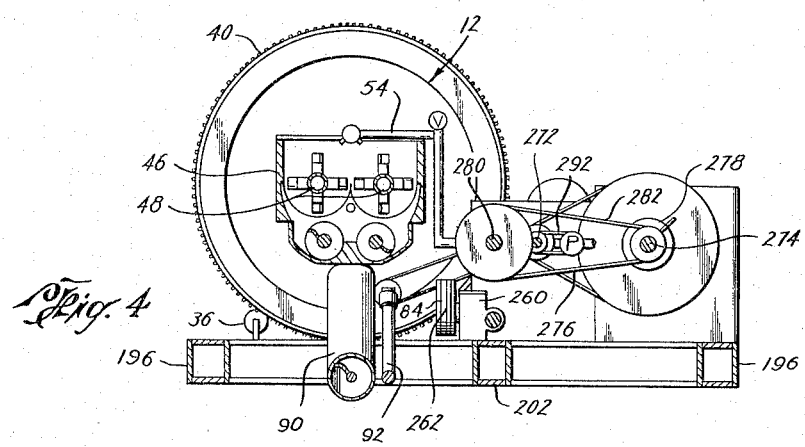
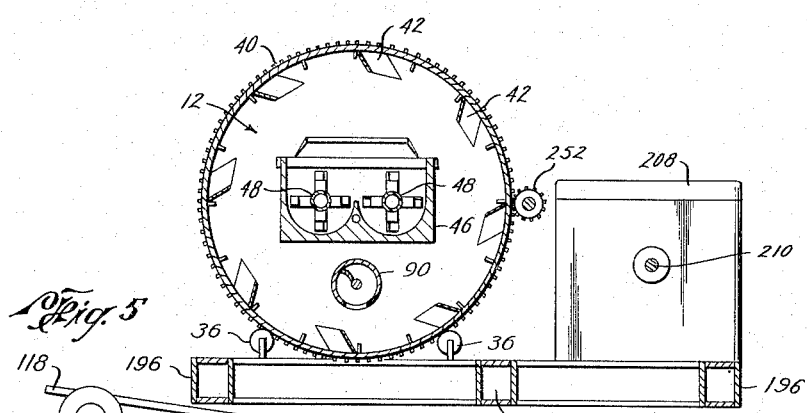
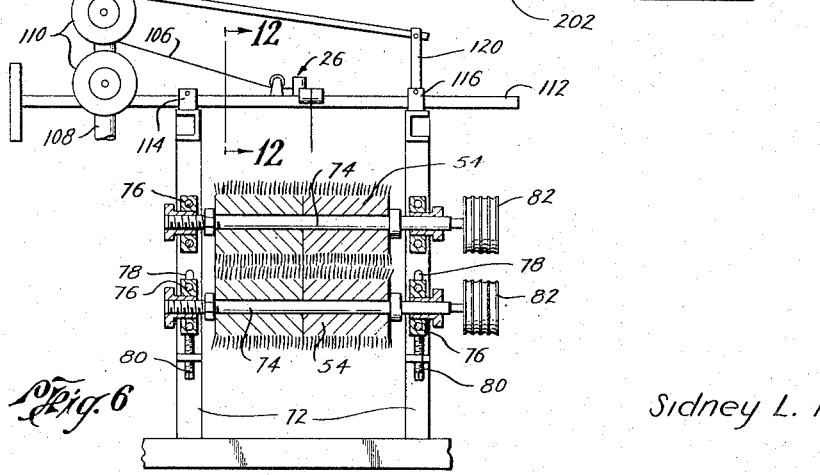
Sidney L. Richards, Jr.
INVENTOR.
BY
Charles E. Lightfoot
ATTORNEY Sept. 25, 1956     S. L. RICHARDS, JR     2,764,218
APPARATUS FOR COATING AND REINFORCING PIPE
Filed Dec. 15, 1950     7 Sheets-Sheet 4

Sidney L. Richards, Jr.
INVENTOR.

BY Charles E. Lightfoot
ATTORNEY

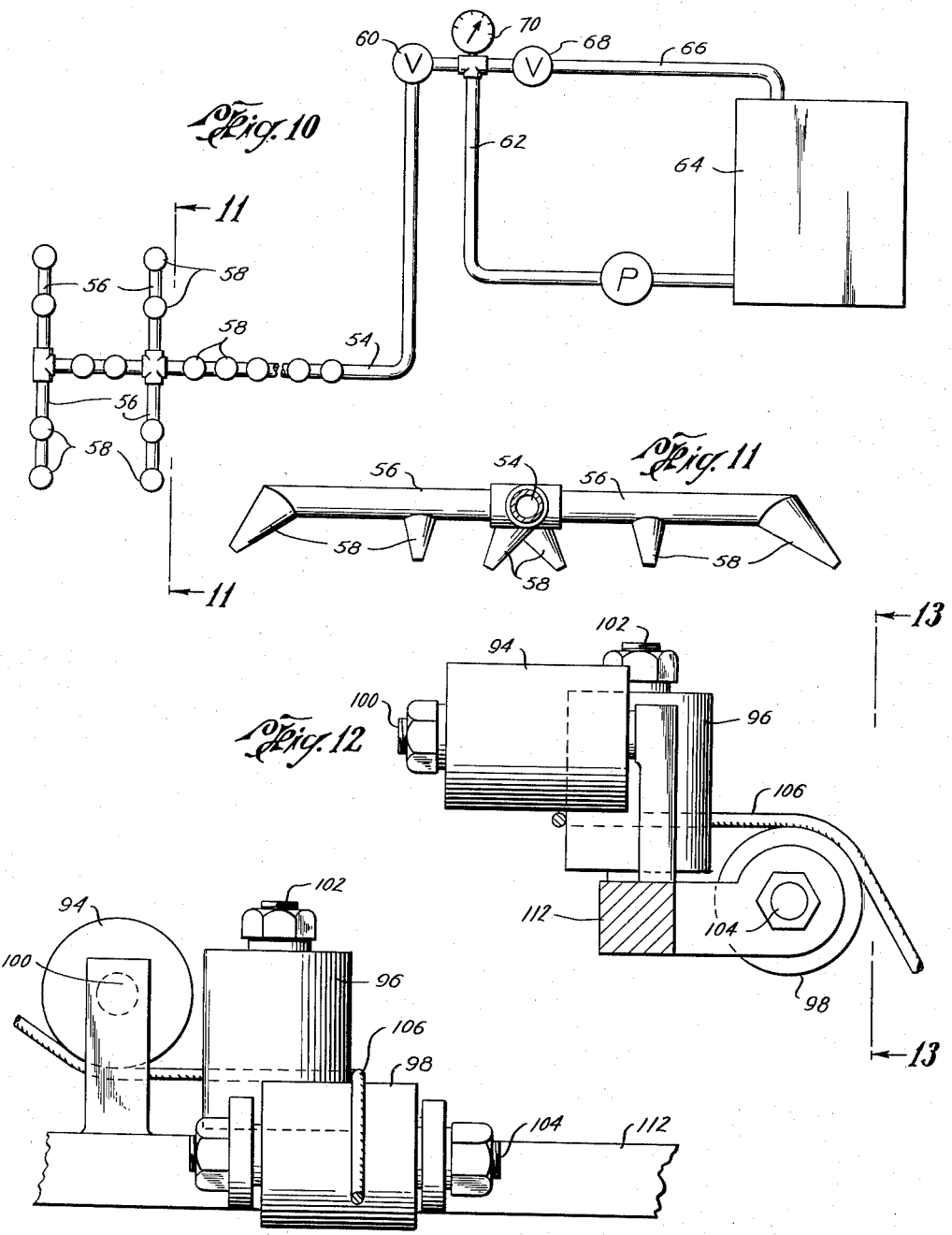

Sept. 25, 1956  S. L. RICHARDS, JR  2,764,218
APPARATUS FOR COATING AND REINFORCING PIPE
Filed Dec. 15, 1950  7 Sheets-Sheet 6
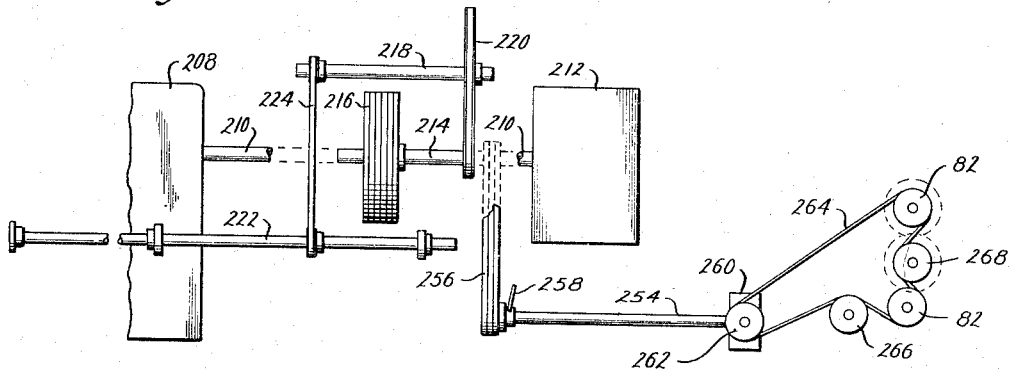
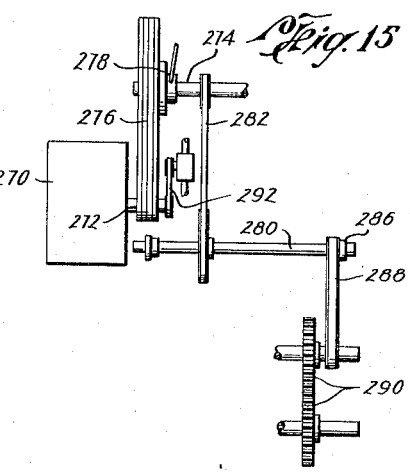
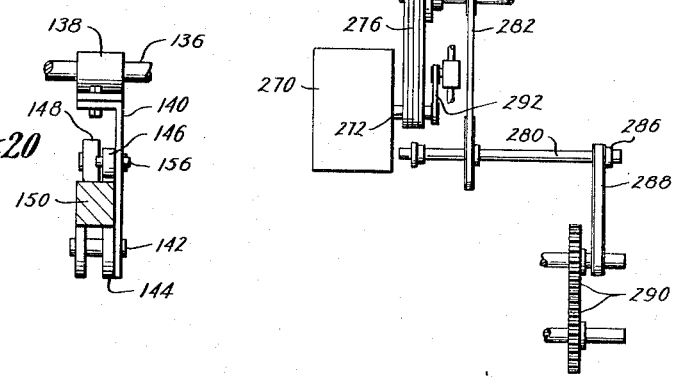
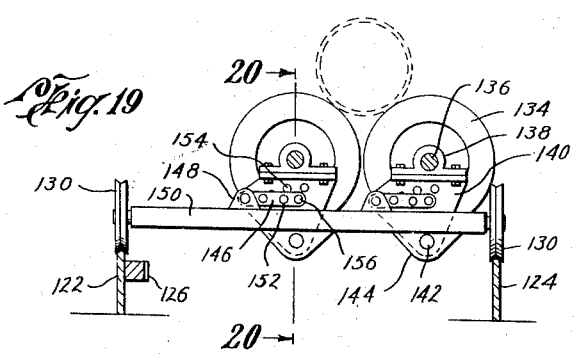
Sidney L. Richards, Jr.
INVENTOR.
BY Charles E. Lightfoot
ATTORNEY Sidney L. Richards, Jr.
INVENTOR.

BY Charles E. Lightfoot
ATTORNEY

United States Patent Office 2,764,218
Patented Sept. 25, 1956

2,764,218

APPARATUS FOR COATING AND REINFORCING PIPE

Sidney L. Richards, Jr., Houston, Tex.

Application December 15, 1950, Serial No. 200,948

2 Claims. (Cl. 154—1.8)

This invention relates to a method and means for coating and reenforcing pipe, and more particularly to a method and apparatus for applying reenforced concrete to the outsides of pipes.

The invention finds particular application in the preparation of pipe which is to be used in the construction of pipe lines wherein portions of the pipe line must be suitably weighted to prevent upward movement of the same due to the buoying effect of water, in locations where the pipe is submerged or lies in soil whose water content is sufficient to have a floating tendency on the pipe.

An important object of the invention is to provide apparatus for supporting a pipe in position to be coated, and moving the pipe longitudinally while rotating the same, whereby a layer of weighting material of substantially uniform thickness may be applied throughout substantially the entire length of the pipe.

Another object of the invention is the provision of apparatus of the kind referred to having means for mixing the ingredients of the weighting material in a dry condition, adding water to the mix, and bringing the mixture to the desired consistency for application to the pipe.

A further object of the invention is to provide means for winding a continuous wire about the pipe as the same is moved longitudinally, and for positioning the wire at any desired depth in the coating material.

A further object of the invention is the provision of means for returning waste material to the mixing mechanism for remixing with additional coating material to be fed to the zone of application.

A further object of the invention is to provide a machine for coating a pipe having means for adding water to the mixed dry coating ingredients in controlled quantity, as the mixture is fed to the zone of application, whereby the consistency of the material may be regulated within narrow limits, thus assuring uniformity in the result obtained.

A further object of the invention is the provision of adjustable pipe supporting means whereby the position of a section of pipe may be adjusted with relation to the coating apparatus.

The above and other important objects and advantages of the invention will become apparent from the following detailed description, constituting a specification of the same when taken in conjunction with the annexed drawings wherein—

Figure 2 is a side elevational view of the same;

Figure 3 is a cross-sectional view taken along the line 3—3 of Figure 2 looking in the direction indicated by the arrows;

Figure 4 is a cross-sectional view taken along the line 4—4 of Figure 2, looking in the direction indicated by the arrows;

Figure 5 is a cross-sectional view taken along the line 5—5 of Figure 2 looking in the direction indicated by the arrows;

Figure 6 is a cross-sectional view taken along the line 6—6 of Figure 2 looking in the direction indicated by the arrows;

Figure 10 is a plan view showing the piping system and control mechanism separated from the remaining portions of the machine, by which the addition of water to the dry ingredients is controlled;

Figure 11 is a cross-sectional view on a somewhat enlarged scale taken along the line 11—11 of Figure 10;

Figure 12 is a detailed view on a somewhat enlarged scale, partly in section, showing the guide means for the wire wrapping mechanism of the machine;

Figure 13 is an end view of the wire guide means looking at the right hand end of Figure 12;

Figure 14 is a fragmentary side elevational view showing a portion of the driving mechanism of the machine;

Figure 15 is a fragmentary plan view showing another portion of the driving mechanism of the machine;

Figure 19 is a cross sectional view taken along line 19—19 of Figure 16; and

Figure 20 is a cross sectional view taken along line 20—20 of Figure 19.

Figure 1:
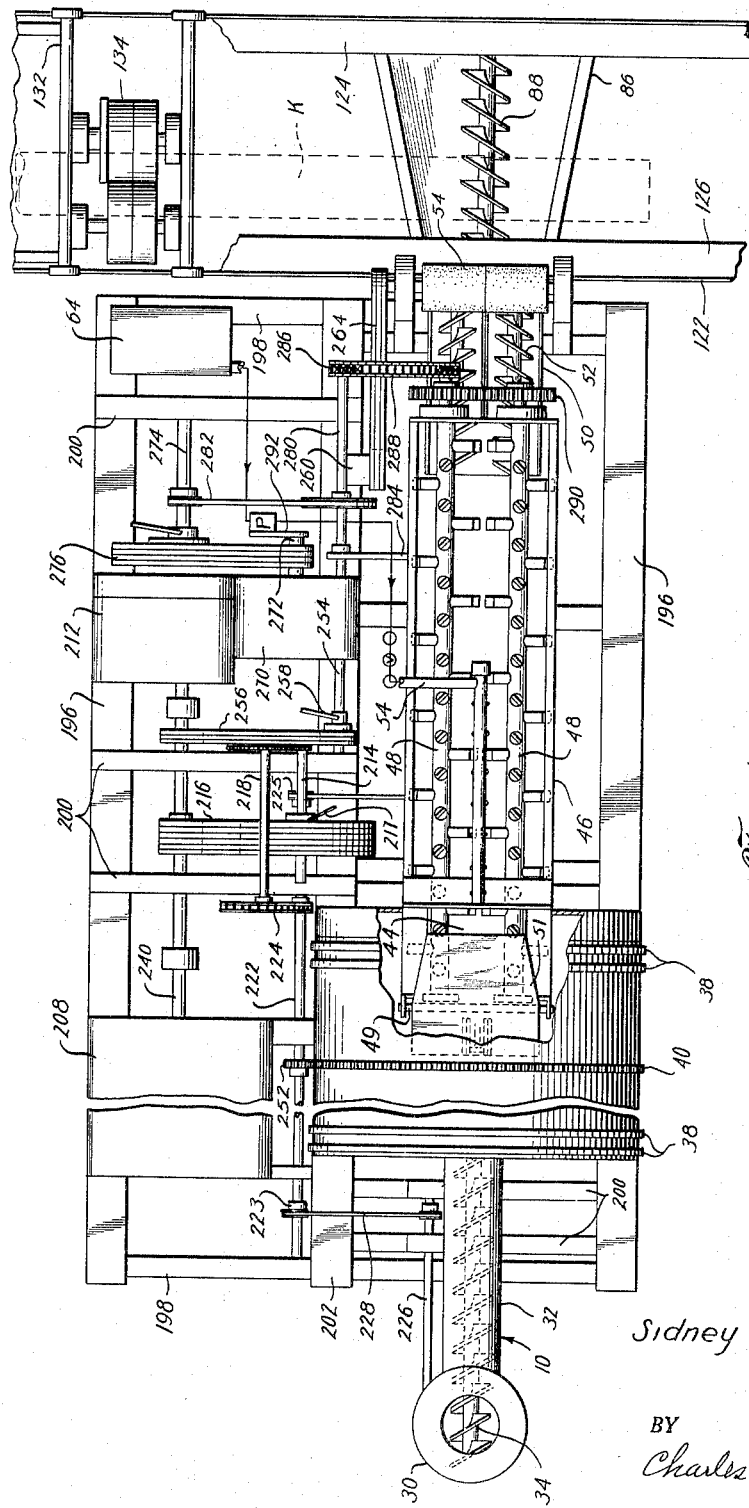
Figure 1 is a top plan view of the invention partly broken away and partly in cross-section.

Referring now to the drawings in greater detail, wherein the like numerals of reference designate the same parts throughout the several views, the numeral 10 indicates generally the means by which the dry ingredients of the weighting composition are introduced into the receiving end of a rotating mixing drum 12, for thorough mixing, after which the material passes out of the drum through mixing and feeding conveyors generally indicated by 14, wherein water is added to the mix through the piping system indicated by 16. From the mixing and feeding conveyors the moistened mix passes to feeding screws 18 and is fed to the revolving brush mechanism 20 by which it is projected onto the pipe K which is rotated and moved bodily past the brush mechanism by pipe supporting and rotating mechanism 22. Waste material from the pipe is collected in the return mechanism 24 by which it is returned to the mixing drum 12 to be mixed with further dry ingredients. Wire feeding and guiding mechanism 26 best seen in Figures 6, 12 and 13, is provided for continuously winding wire on the pipe as the same is rotated and moved past the coating machine.

Figure 8:
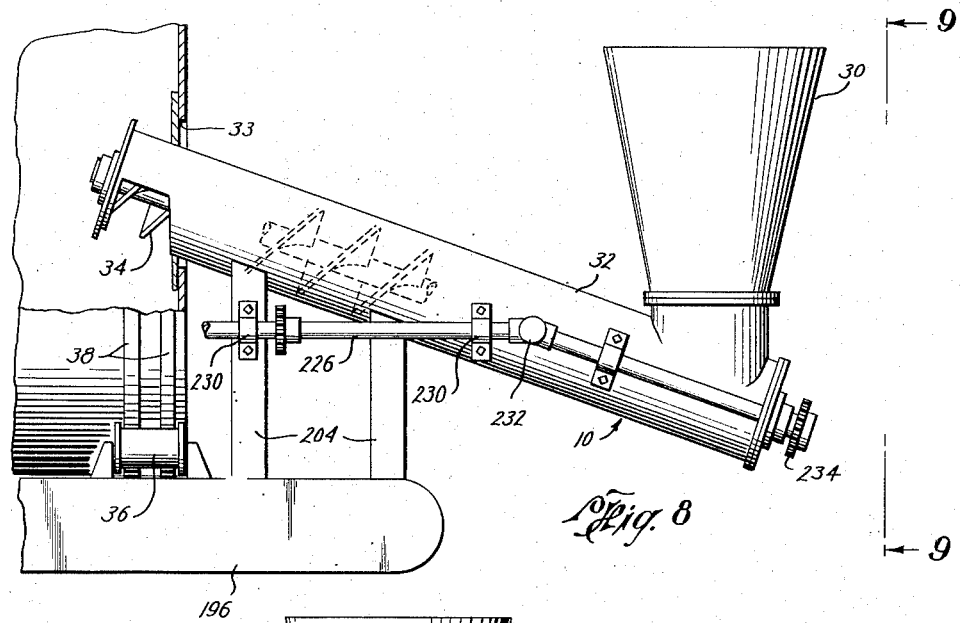
Figure 8 is a fragmentary view partly in section showing the mechanism by which the dry ingredients are fed into the mixing mechanism.
Figure 9:
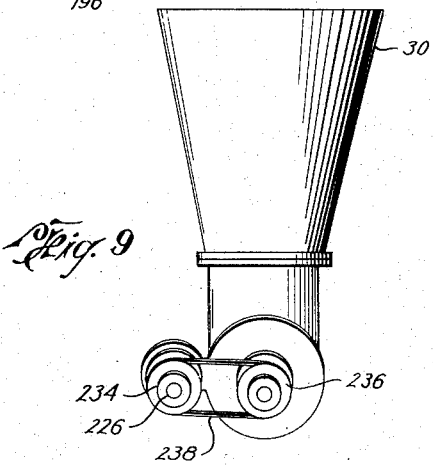
Figure 9 is an end elevational view looking at the right end of the apparatus shown in Figure 8.

The means by which the dry ingredients are fed to the mixing drum are best shown in Figures 8 and 9, and may conveniently be in the form of a hopper 30 from which a conveyor tube 32 housing feeding screw 34 extends into an open end 33 of the mixing drum. The mixing drum 12 is supported on spaced rollers 36, suitably attached to the frame of the apparatus, and supportingly engaging exterior tracks 38 on the drum, and the drum has an external ring gear 40 therearound by which the drum is rotated by means later to be described. Within the drum are inwardly extending veins 42 arranged to mix the dry ingredients upon rotation of the drum and to feed the same into the mixing and feeding conveyors through a variable opening 44 therein inside the drum.

The mixing and feeding conveyors extend into the discharge drum and include a trough like casing 46 within which are located a number of feeding and mixing devices 48, in the present illustration two of such devices being employed. At its outer end the casing 46 opens downwardly into a casing 50 in which the feeding screws 52 are located, whereby the moistened mixture is fed to a plurality of rotating brushes 54, which propel the material onto the pipe K. At the top of the casing 46, there is located a water pipe 55 from which branch pipes 56 extend above the feeding and mixing devices 48 and are provided with downwardly directed nozzles 58 through which water is distributed to the mixture. The water pipe 55 leads through a valve 60 to an outlet pipe 62 connected to a pipe pump P which communicates with water source 64. A return pipe 66 controlled by a valve 68 is also connected with the water pipe 55, whereby excess water from the pump may be returned to the water source. A gauge 70 of conventional design is connected to the pipe 62, and by suitably controlling the flow of water from the pump to the water pipe 55 by adjusting the valves 60 and 68, the amount of water added to the dry mixed ingredients may be accurately regulated.

The rotary brush assembly 20 is supported by uprights 72 and comprises parallel horizontal shafts 74, supported in bearings 76 attached to the uprights, the lower set of bearings being movably held in slots 78, and adjustable vertically therein by means of screws 80. Thus the brushes 54 may be suitably adjusted with relation to each other to uniformly propel the coating material onto the pipe K. Pulleys 82 are attached to the projecting ends of the shafts 74, over which pulleys a driving belt passes whereby the brushes are rotated.

The waste return assembly 24 comprises a hopper 86 positioned beneath the pipe K below the brushes 54, into which waste material may fall, and a return screw 88 rotatably carried in the tube 90 feeds the waste material from the hopper back into the mixing drum. The return screw 88 is driven by a shaft 92 through intermeshing gears or the like, and the shaft is rotated by suitable means later to be disclosed.

The wire feeding mechanism 26 includes a guide roller assembly located above the brushes 54. Such assembly comprises rollers 94, 96 and 98 rotatably mounted in suitable bearings. The roller 94 is supported horizontally on a shaft 100 at right angles to the vertical shaft of the roller 96; and the roller 98 is supported horizontally on a shaft 104 at right angles to both the rollers 94 and 96. The wire 106 may thus pass beneath the roller 94, above the roller 96, and over the roller 98 and downwardly and about the pipe K. The entire roller assembly is carried on a shaft 112 which is slidably mounted in bearings 114 and 116 on the uprights 72 so that the rollers may be moved horizontally to any desired position above the brushes in order to adjust the point at which the wire will be wound about the pipe in a direction parallel to the axis of the pipe.

A rack 108 is suitably located above the brushes for the support of reels of wire from which the wire is fed about the guiding rollers to be wound about the pipe. In order to properly tension the wire as it is wound about the pipe, means such as the weight bar 118 is pivotally secured at one end to the upper end of an upright 120 which is rotatably carried on one of the uprights 72. The weight bar rests upon one of the reels 110 and may be of such weight as to give the desired tension to the wire as it is unwound therefrom. The weight bar may be shifted to engage any desired reel of wire and several such bars may be provided as desired. By properly tensioning the wire 106, and adjusting the point at which it is wound on the pipe, with relation to the zone of application of the coating material, the depth at which the wire will be located in the coating may be regulated to any desired degree. Thus, the wire may be wound very close to the surface of the coating, or it may be positioned closely adjacent the surface of the pipe, or at any intermediate point in the depth of the coating, for purposes of securing the maximum reinforcing effect in the coating, and assuring that the coating will remain attached to the pipe, even under conditions of extreme bending of the pipe.

The mechanism by which the pipe is supported and moved longitudinally past the coating apparatus, while rotating the pipe is partly seen in Figures 1 and 2, and is illustrated in detail in Figures 16 to 20, inclusive, of the drawing. This mechanism takes the form of a track way having spaced apart rails 122 and 124, the rail 122 being provided with an inwardly extending rack 126 extending over substantially its entire length. An operating carriage, generally indicated at 128, having grooved wheels 130, is disposed on the trackway, and a free carriage 132, having similar wheels is also positioned on the trackway, these carriages being arranged to support the pipe for longitudinal movement along the track and to rotate the pipe as the same is moved past the coating apparatus. Both of the pipe supporting carriages are provided with sets of adjustable pipe engaging and supporting wheels or rollers 134, which are preferably provided with rubber tires, and are adjustable laterally and vertically of the carriages, whereby the axis of a section of pipe of any diameter may be adjusted to bring the surface of the pipe into proper relation with the coating apparatus in order to secure the maximum efficiency in the coating operation. Thus, the pipe may be disposed on the carriages so that the coating material will strike the surface of the pipe at substantially a right angle, whereby a maximum of adherence of the coating material is secured, and loss of coating material is reduced to a minimum.

The sets of pipe engaging rollers are supported on the carriages in the manner illustrated in detail in Figures 19 and 20 of the drawing, wherein each pair of rollers is supported on a shaft 136 carried in suitable bearings 138, attached to the upper ends of brackets 140, which are pivotally attached at their lower ends to pivot pins 142 extending through lower brackets 144 attached to the frame structure of the carriage.

The pivoted brackets 140 are maintained in adjusted positions by means of links 146, each of which is pivoted to a side bracket 148 on one of the axles 150, and each link has a number of spaced holes 152 any of which may be brought into alignment with one of the holes 154 provided in the brackets 140, so that a pin or bolt 156 may be placed through the aligned holes to connect the link to the pivoted bracket. It will be apparent that by removing the bolts 156 the pivoted brackets 140 may be moved to any desired position for adjusting the rollers 134 vertically and laterally of the carriage, to accommodate pipe sections of widely varying diameters, whereby the axis of the pipe may be located at the same position with relation to the coating apparatus. The bolts 156 may then be reinserted in the aligning holes in the links and pivoted brackets, to secure and maintain the rollers in adjusted position.

Figure 16:
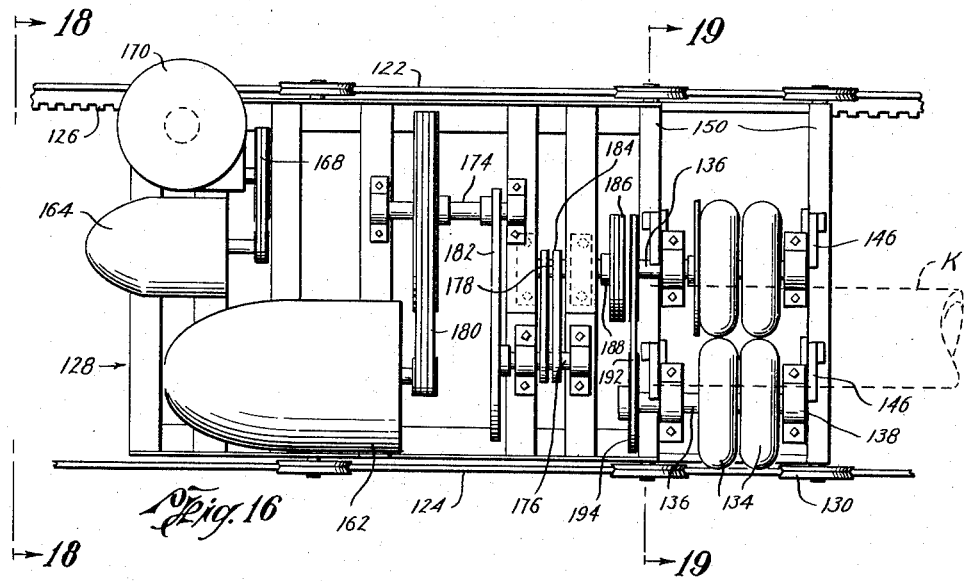
Figure 16 is a plan view of the carriage by which the pipe is simultaneously moved longitudinally and rotated, while being coated.
Figure 17:
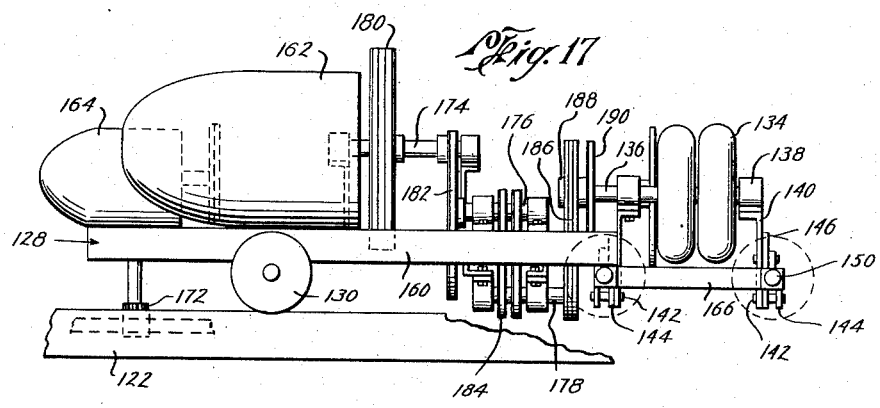
Figure 17 is a side elevational view of the carriage shown in Figure 16.
Figure 18:
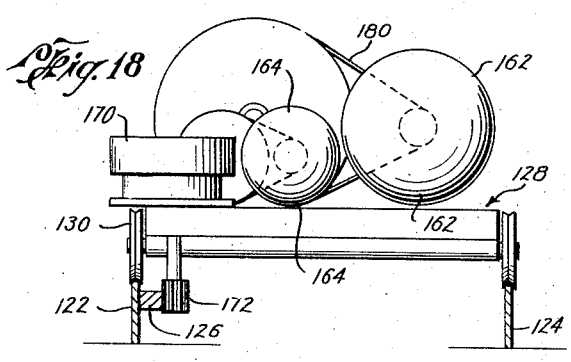
Figure 18 is a cross sectional view taken along line 18—18 of Figure 16.

The operating carriage 128, as best seen in Figures 16, 17 and 18 has a main frame 160, upon which the driving motors 162 and 164 are mounted and is provided at one end with a sub-frame 166, upon which the pipe engaging rollers are mounted. The motors 162 and 164 are preferably electric motors, the motor 164 having a belt drive 168 through which the transmission mechanism 170 is operated, and which in turn rotates the vertical pinion 172 engaging the rack 126 of the rail 122, whereby the operating carriage is propelled along the tracks.

Motor 162 is connected in driving relation to the sets of rollers by means of a series of counter-shafts 174, 176 and 178, connected by suitable driving belts such as those indicated at 180, 182 and 184, respectively. The lowermost counter-shaft 178 is operatively connected by a driving belt 186, to a pulley 188 attached to one of the shafts 136, the arrangement being such that the rollers 134 may be adjusted laterally and vertically of the frame of the operating carriage without interference with the driving mechanism of the rollers. Each of the shafts 136 also has a pulley 190 thereon, and these pulleys are operatively connected by a driving belt 192, whereby both sets of the rollers 134 will be simultaneously operated to rotate a pipe section supported thereon.

Suitable electrical controls and wiring, not shown, are provided for the operation of the motors 162 and 164, which controls may be located in any convenient position for the use of the operator of the machine. It will be apparent that by controlling the speed of the motors 162 and 164 a section of pipe supported on the operating carriage and the free carriage may be moved longitudinally of the track and rotated at the same time at any desired rate of speed, whereby the uniform coating of the pipe as the same passes in front of the coating mechanism may be accomplished.

The entire coating apparatus may be mounted on a base, as best seen in Figures 1 and 2 of the drawings, which base conveniently takes the form of a frame having longitudinal side members 196, connected at the ends by end members 198, and having cross ties 200, located at suitable intervals immediate the ends of the frame. The frame may also have a substantially centrally located longitudinal member 202, connected to the end members 198 and to which the cross ties 200 are secured. Upright supports 204 attached to the base, support the mechanism 10, by which the dry ingredients are introduced into the mixing drum, and additional upright supports 206 secured to the base immediate its ends, support the mixing and feeding apparatus 14 thereon.

The driving mechanism by which the entire coating machine mechanism is operated will best be seen in Figures 1, 2, 14 and 15 of the drawings. This driving mechanism comprises an engine 208, of the internal combustion type, which drives a shaft 210, connected in driving relation to an electrical generator 212 and also driving a shaft 214, through a suitable belt connection 216 and a clutch 217. Shaft 214 is in driving connection with a counter-shaft 218, through suitable sprockets and a driving chain 220, and the counter-shaft 218 is in turn drivingly connected to a shaft 222, through suitable sprockets and a drive chain 224, whereby the need of rotation of the shaft 222 with relation to the shaft 214 may be predetermined as desired. Shaft 222 is provided with suitable sprockets or pulleys, one of which indicated at 223 is drivingly connected with a similar sprocket or pulley on a counter-shaft 226 by means of a belt or chain 228, which counter-shaft 226 is carried in suitable bearings 230 attached to one of the uprights 204 and to the conveyor tube 32. A universal joint 232 is provided in the shaft 226, and at its outer end this shaft has a sprocket 234, which is drivingly connected to a similar sprocket 236 by means of chain 238, the sprocket 236 being attached to the outer end of the shaft of the conveyor screw 34, whereby the conveyor screw is rotated to feed dry material to the mixing drum. The other pulley or sprocket 225 of the shaft 222 is drivingly connected with the drive shaft 92, by means of a suitable belt or chain 240, and the shaft 92 is carried in suitable bearings 242 attached to the return tube 90. Shaft 92 has a universal joint 244, and carries at its lower end suitable means, such as a sprocket 246, which is drivingly connected to a similar sprocket 248 by a chain 250, the sprocket being attached to the outer end of the shaft of the return screw 88, whereby this screw may be operated to return waste material from the hopper 86 to the mixing drum. Shaft 222 also carries a gear 252, which meshes with the external ring gear 40 by which the mixing drum is rotated.

Shaft 210, which is driven by the engine is also drivingly connected to a shaft 254, through the intermediation of suitable sprockets, or pulleys and a drive chain 256 or driving belt, and suitable clutch means 258, whereby the operation of the shaft 254 may be controlled. Shaft 254 is connected to a right angle transmission gear mechanism 260, which rotates a pulley 262 which is in turn drivingly connected to the brushes 54 by means of a driving belt 264, which passes over the brush pulleys 82. Idler pulleys 266 and 268 may be provided for assuring adequate driving contact between the belt 264 and the brush pulleys 82, as best seen in Figure 14 of the drawing.

An electric motor 270 is connected to be driven by the generator through any suitable electrical circuit not shown. This motor has a shaft 272 which is drivingly connected to a counter-shaft 274, by means of suitable sprockets, pulleys or the like and a sprocket chain or driving belt 276. Suitable clutch means such as 278 may be interposed in the driving connection between the shaft 272 and the shaft 274, to control the operation of the latter. The counter-shaft 274 is drivingly connected to a shaft 280, through the intermediation of sprockets or pulleys, and a drive chain or belt 282, and this shaft 280 is drivingly connected to the feeding screws 52 by suitable pulleys or sprockets over which a chain or belt 284 operates. The shaft 280 is also provided with another sprockets 286, which is operatively connected by means of a chain 288 with a sprocket on the end of the shaft hub. The shafts of the mixing devices 48 are provided with intermeshing gears 290, whereby these devices will be simultaneously rotated by operation of the shaft 280, upon operation of the electric motor 270.

The shaft 272 of the electric motor is also operatively connected with the pump P by suitable sprockets or pulleys mechanism indicated at 292. The driving mechanism which is operated by the electric motor 270 is best seen in Figure 15 of the drawing.

Figure 7:
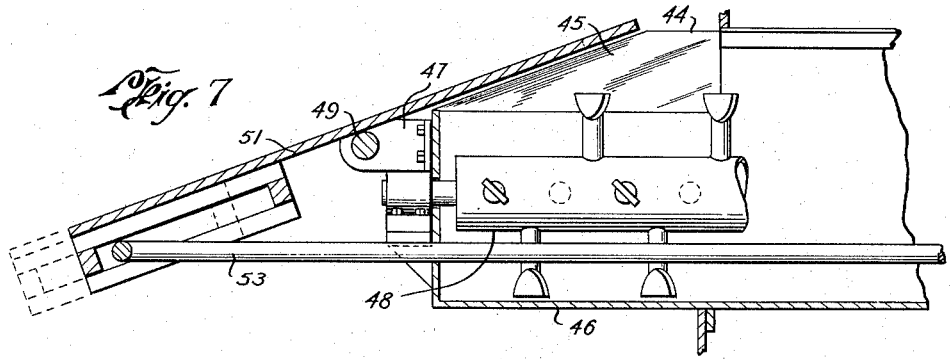
Figure 7 is a fragmentary view partly in section, showing a portion of the mixing and feeding mechanism.

The end of the mixing mechanism which projects into the mixing drum has a variable opening 44 therein, as previously described, and is provided with sloping sides 45. Spaced brackets 47 extend from the end of the mixing mechanism, between which brackets a shaft 49 is supported, and a slidable cover plate 51 is supported on the shaft 49, which plate is operatively attached to a rod 53, leading to some convenient point for operation to adjust the position of the cover 51 to increase or decrease the size of the opening 44, as will best be seen in Figure 7 of the drawing. By adjusting the size of the opening 44, the amount of the dry mix ingredients admitted from the drum to the mixing mechanism can be accurately regulated.

It is believed that the operation of the coating machine will be apparent from the above description. In the operation of the machine the dry ingredients are dumped into the hopper 30, from whence they will be conveyed by way of the conveyor 32 by the feeding screw 34 into the mixing drum 12, wherein they will be thoroughly intermingled by rotation of drum and fed through the opening 44 into the mixing mechanism 14. In the mixing mechanism the ingredients will be further mixed by the mixing screws 48, while moisture is added to the ingredients through the pipe 55, branch pipes 56, and nozzles 58, whereby the ingredients will be moistened to the exact degree desired and moved through the mixing mechanism into the casing 50. The moistened material is then fed by the screws 52 to the brushes 54, which propel the same against the pipe K, which is being simultaneously moved past the brushes and rotated. At the same time the wire 106, which has been secured above the pipe K is wound about the pipe, forming a spiral reinforcement in the coating at the desired depth therein. Any material which does not adhere to the pipe K immediately falls into the waste hopper 86 from whence it is returned to the mixing drum by the screw 88 operating in the return tube 90.

It will thus be seen that by suitably controlling the speed of rotation and longitudinal movement of the pipe K, as well as the amount of material which is projected by the brushes 54 against the outer surface of the pipe, a coating of uniform character and any desired thickness may be obtained on the pipe. It will also be apparent that the entire mechanism may be easily operated by a single operator through the various controls provided, so that the operation of the machine can be closely regulated to secure uniform results.

The invention has been disclosed in connection with a specific embodiment of the same, but it will be understood that this is intended by way of illustration only, and numerous modifications may be made in the construction and arrangement of the various parts, without departing from the spirit of the invention, and within the scope of the appended claims.

What is claimed as new and desired to secure by Letters Patent is—

1. An apparatus for coating pipe comprising supporting means rotatively carrying a pipe to be coated, said supporting means being movable in the direction of the axis of the pipe, coating applying means disposed to propel a plastic coating composition against the pipe throughout a zone of limited extent in a direction longitudinally of the pipe, means for supporting a wire to be wound about the pipe in said zone, means for effecting rotation of the pipe and longitudinal movement of the supporting means to effect winding of the wire in a spiral about the pipe, and means adjustable longitudinally of said zone for guiding the wire to adjust the location at which the wire is wound on the pipe in said zone to regulate the depth to which the wire is embedded in said coating.

2. An apparatus for coating pipe comprising supporting means rotatively carrying a pipe to be coated, said supporting means being movable in the direction of the axis of the pipe, coating applying means disposed to propel a plastic coating composition against the pipe throughout a zone of limited extent in a direction longitudinally of the pipe, means for supporting a wire to be wound about the pipe in said zone, means for effecting rotation of the pipe and longitudinal movement of the supporting means to effect winding of the wire in a spiral about the pipe, means adjustable longitudinally of said zone for guiding the wire to a selected location in said zone, and means for tensioning the wire to regulate the depth to which the wire is embedded in said coating.

References Cited in the file of this patent
UNITED STATES PATENTS

| | | |
|---|---|---|
| 998,762 | Faller | July 25, 1911 |
| 1,024,221 | Osgood | Apr. 23, 1912 |
| 1,044,807 | Olney | Nov. 19, 1912 |
| 1,146,477 | Cole et al. | July 13, 1915 |
| 1,731,953 | Thomson | Oct. 15, 1929 |
| 1,753,716 | Owen | Apr. 8, 1930 |
| 1,954,005 | Westberg et al. | Apr. 10, 1934 |
| 2,280,252 | Muehleck | Apr. 21, 1942 |
| 2,301,165 | Neal | Nov. 3, 1942 |
| 2,352,749 | Wills | July 4, 1944 |
| 2,373,636 | Perkins | Apr. 10, 1945 |